US012034944B2

(12) United States Patent
Gao et al.

(10) Patent No.: US 12,034,944 B2
(45) Date of Patent: Jul. 9, 2024

(54) VIDEO ENCODING METHOD AND APPARATUS, VIDEO DECODING METHOD AND APPARATUS, ELECTRONIC DEVICE AND READABLE STORAGE MEDIUM

(71) Applicant: Tencent Technology (Shenzhen) Company Limited, Shenzhen (CN)

(72) Inventors: Xinwei Gao, Shenzhen (CN); Weiran Li, Shenzhen (CN); Chenchen Gu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 282 days.

(21) Appl. No.: 17/469,716

(22) Filed: Sep. 8, 2021

(65) Prior Publication Data
US 2021/0409736 A1 Dec. 30, 2021

Related U.S. Application Data

(63) Continuation of application No. PCT/CN2020/116600, filed on Sep. 21, 2020.

(30) Foreign Application Priority Data

Sep. 27, 2019 (CN) .......................... 201910927955.4

(51) Int. Cl.
*H04N 19/30* (2014.01)
*H04N 19/176* (2014.01)
(Continued)

(52) U.S. Cl.
CPC ........... *H04N 19/30* (2014.11); *H04N 19/176* (2014.11); *H04N 19/46* (2014.11); *H04N 19/70* (2014.11)

(58) Field of Classification Search
CPC ............................ H04N 19/30; H04N 19/176
See application file for complete search history.

(56) References Cited

U.S. PATENT DOCUMENTS 10,565,463 B2 * 2/2020 Wang .................... G06V 20/46
10,972,753 B1 * 4/2021 Duanmu .............. H04N 21/816
(Continued)

FOREIGN PATENT DOCUMENTS

CN 106664403 A 5/2017
CN 108391127 A 8/2018
(Continued)

OTHER PUBLICATIONS

Tencent Technology, ISR, PCT/CN2020/116600, Dec. 21, 2020, 2 pgs.
(Continued)

*Primary Examiner* — Irfan Habib
(74) *Attorney, Agent, or Firm* — Morgan, Lewis & Bockius LLP

(57) ABSTRACT

This application discloses a video encoding method and apparatus, a video decoding method and apparatus, an electronic device, and a computer-readable storage medium. The method includes: obtaining a current video frame, the current video frame being divided into a plurality of tile-divided Tile regions; determining a resolution corresponding to each Tile region in the plurality of Tile regions to obtain a plurality of resolutions, the plurality of resolutions including at least two different resolutions; and decoding the Tile region based on the resolution corresponding to the Tile region among the plurality of resolutions, to obtain a decoded video frame.

15 Claims, 8 Drawing Sheets

(51) Int. Cl.
*H04N 19/46* (2014.01)
*H04N 19/70* (2014.01)

(56) References Cited

U.S. PATENT DOCUMENTS

| | | | | |
|---|---|---|---|---|
| 11,616,961 | B2* | 3/2023 | Wang | H04N 19/174 |
| | | | | 375/240.01 |
| 11,778,205 | B2* | 10/2023 | Wang | H04N 19/174 |
| | | | | 375/240.01 |
| 2007/0274599 | A1 | 11/2007 | Ishikawa | |
| 2012/0141026 | A1* | 6/2012 | Yoon | G06T 9/00 |
| | | | | 382/167 |
| 2013/0202051 | A1* | 8/2013 | Zhou | H04N 19/521 |
| | | | | 375/240.26 |
| 2013/0308709 | A1* | 11/2013 | Norkin | H04N 19/17 |
| | | | | 375/240.01 |
| 2014/0003525 | A1* | 1/2014 | Fuldseth | H04N 19/44 |
| | | | | 375/240.16 |
| 2014/0099066 | A1* | 4/2014 | Jang | G09G 5/363 |
| | | | | 386/230 |
| 2015/0023407 | A1* | 1/2015 | Sato | H04N 19/17 |
| | | | | 375/240.02 |
| 2017/0178386 | A1* | 6/2017 | Redshaw | G06F 9/5083 |
| 2017/0251204 | A1* | 8/2017 | Gupte | H04N 19/597 |
| 2018/0182066 | A1* | 6/2018 | Saleh | G06T 15/005 |
| 2018/0348961 | A1* | 12/2018 | Wilczynski | G06F 16/322 |
| 2021/0127111 | A1* | 4/2021 | George | H04N 19/96 |
| 2024/0098280 | A1* | 3/2024 | Joshi | H04N 19/30 |

FOREIGN PATENT DOCUMENTS

| | | |
|---|---|---|
| CN | 108650460 A | 10/2018 |
| CN | 108781288 A | 11/2018 |
| CN | 108924554 A | 11/2018 |
| CN | 109525842 A | 3/2019 |
| CN | 110677692 A | 1/2020 |

OTHER PUBLICATIONS

Tencent Technology, WO, PCT/CN2020/116600, Dec. 21, 2020, 4 pgs.
Tencent Technology, IPRP, PCT/CN2020/116600, Mar. 15, 2022, 5 pgs.

* cited by examiner

VIDEO ENCODING METHOD AND APPARATUS, VIDEO DECODING METHOD AND APPARATUS, ELECTRONIC DEVICE AND READABLE STORAGE MEDIUM

CROSS-REFERENCE TO RELATED APPLICATIONS

This application is a continuation application of PCT Patent Application No. PCT/CN2020/116600, entitled "VIDEO ENCODING METHOD AND APPARATUS, VIDEO DECODING METHOD AND APPARATUS, ELECTRONIC DEVICE, AND READABLE STORAGE MEDIUM" filed on Sep. 21, 2020, which claims priority to Chinese Patent Application No. 201910927955.4, entitled "VIDEO ENCODING METHOD AND APPARATUS, VIDEO DECODING METHOD AND APPARATUS AND APPARATUS, ELECTRONIC DEVICE, AND READABLE STORAGE MEDIUM" filed with the China National Intellectual Property Administration on Sep. 27, 2019, all of which are incorporated herein by reference in their entirety.

This application is related to U.S. patent application Ser. No. 17/469,710, entitled "VIDEO DECODING METHOD AND APPARATUS, VIDEO ENCODING METHOD AND APPARATUS, STORAGE MEDIUM, AND ELECTRONIC DEVICE" filed on Sep. 8, 2021, which is incorporated by reference in its entirety.

This application is related to U.S. patent application Ser. No. 17/469,721, entitled "VIDEO ENCODING METHOD, VIDEO DECODING METHOD, AND RELATED APPARATUSES" filed on Sep. 8, 2021, which is incorporated by reference in its entirety.

This application is related to U.S. patent application Ser. No. 17/469,729, entitled "VIDEO DECODING METHOD AND APPARATUS, VIDEO ENCODING METHOD AND APPARATUS, STORAGE MEDIUM, AND ELECTRONIC DEVICE" filed on Sep. 8, 2021, which is incorporated by reference in its entirety.

FIELD OF THE TECHNOLOGY

This application relates to the field of computer graphics and image processing technologies, and in particular, to a video encoding method and apparatus, a video decoding method and apparatus, an electronic device, and a computer-readable storage medium.

BACKGROUND OF THE DISCLOSURE

With the increase in user demand for high-definition videos, video data volumes are also increasing. Without compression, such videos cannot be easily applied to actual storage and transmission. A video encoding and decoding technology can effectively compress video data, implementing rapid transmission and offline storage of the video data on the Internet. Therefore, a video compression and decoding technology is a key technology in video application.

However, in a video encoding and decoding process of the related art, relatively large distortion occurs in a video, affecting normal playback of the video.

SUMMARY

Embodiments of this application provide a video encoding method and apparatus, a video decoding method and apparatus, an electronic device, and a computer-readable storage medium, to reduce distortion in a video encoding and decoding process.

An embodiment of this application provides a video decoding method performed by an electronic device, the method including:

obtaining a current video frame to be decoded, the current video frame being divided into a plurality of tile-divided Tile regions;

determining a resolution corresponding to each Tile region in the plurality of Tile regions to obtain a plurality of resolutions, the plurality of resolutions including at least two different resolutions; and decoding the Tile region based on the resolution corresponding to the Tile region among the plurality of resolutions, to obtain a decoded video frame.

An embodiment of this application provides a video encoding method performed by an electronic device, the method including:

performing division processing on a current video frame to be encoded to obtain a plurality of tile-divided Tile regions included in the current video frame;

determining a resolution corresponding to each Tile region in the plurality of Tile regions to obtain a plurality of resolutions, the plurality of resolutions including at least two different resolutions; and encoding the Tile region based on the resolution corresponding to the Tile region among the plurality of resolutions, to obtain encoded data of the current video frame.

An embodiment of this application provides a non-transitory computer-readable storage medium, storing computer-readable instructions, the computer-readable instructions being configured to perform the foregoing video encoding method or video decoding method when being run.

An embodiment of this application provides an electronic device, including a memory and a processor, the memory storing computer-readable instructions, and the processor being configured to perform the foregoing video encoding method or video decoding method through executing the computer-readable instructions.

In the embodiments of this application, the Tile region is decoded based on the resolution corresponding to the Tile region among the plurality of resolutions to obtain the decoded video frame, so that different blocks in a frame of a video are adaptively decoded by using corresponding resolutions. In this way, regardless of whether a transmission bandwidth is relatively small, or whether the transmission bandwidth is relatively large, corresponding peak signal-to-noise ratios (PSNRs) are relatively large, and distortion is relatively small, reducing fluctuations in the PSNRs of video encoding and decoding.

DESCRIPTION OF EMBODIMENTS

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In this specification, the claims, and the accompanying drawings of this application, the terms "first", "second", and so on are intended to distinguish similar objects but do not necessarily indicate a specific order or sequence. It is to be understood that the data termed in such a way are interchangeable in appropriate circumstances, so that the embodiments of this application described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
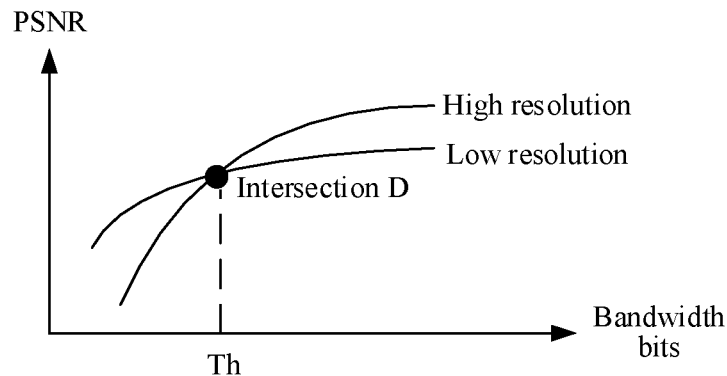
FIG. 1 is a schematic diagram of a PSNR of a codec manner in the related art.

During implementation of the embodiments of this application, it is found that in a video encoding process of the related art, as shown in FIG. 1, if different blocks in a frame of a video are encoded with a high resolution, when a transmission bandwidth is relatively small (for example, less than a bandwidth threshold Th shown in FIG. 1), a PSNR 1 used in a case in which different blocks in a frame of the video are encoded with a high resolution is lower than a PSNR 2 used in a case in which different blocks in a frame of the video are encoded with a low resolution. In other words, when the transmission bandwidth is relatively small, the PSNR 1 when a high resolution is used for encoding is relatively small, and distortion is relatively large.

Similarly, if different blocks in a frame of the video are encoded with a low resolution, when the transmission bandwidth is relatively large (for example, greater than the bandwidth threshold Th shown in FIG. 1), a PSNR 3 corresponding to the case in which different blocks in a frame of the video are encoded with a low resolution is lower than a PSNR 4 corresponding to a case in which different blocks in a frame of the video are encoded with a high resolution. In other words, when the transmission bandwidth is relatively large, the PSNR 3 when a low resolution is used for encoding is relatively small, and distortion is relatively large.

In addition, because for different types of videos, different frames in the same video, or different blocks in the same frame, an intersection D shown in FIG. 1 moves, fluctuations in the PSNRs are relatively large due to the use of the same resolution for video encoding and decoding.

To resolve the foregoing problems, the embodiments of this application provide a video encoding method and apparatus, a video decoding method and apparatus, an electronic device, and a computer-readable storage medium, to reduce distortion in a video encoding and decoding process.

The video encoding method and the video decoding method provided in the embodiments of this application may be implemented by a terminal or a server alone, or may be collaboratively implemented by the terminal and the server. For example, after acquiring a to-be-encoded video, the terminal independently performs the video encoding method described below, to obtain encoded data of the to-be-encoded video and store the encoded data. When the video needs to be played, the video decoding method described below is used to decode the encoded data, and the video is played. After acquiring a to-be-encoded video, a terminal A performs the video encoding method described below on the to-be-encoded video, to obtain encoded data of the to-be-encoded video, and sends the encoded data to the server. The server decodes the encoded data, and sends the decoded video to a terminal B for playback.

The electronic device provided in the embodiments of this application for implementing the video encoding method and the video decoding method described below may be various types of terminal devices or servers. The server may be an independent physical server, or may be a server cluster or a distributed system including a plurality of physical servers, or may be a cloud server that provides cloud computing services. The terminal may be a smartphone, a tablet computer, a notebook computer, a desktop computer, a smart speaker, a smart watch, or the like, and is not limited thereto. The terminal and the server may be directly or indirectly connected in a wired or wireless communication manner. This is not limited in this application.

Figure 3A:
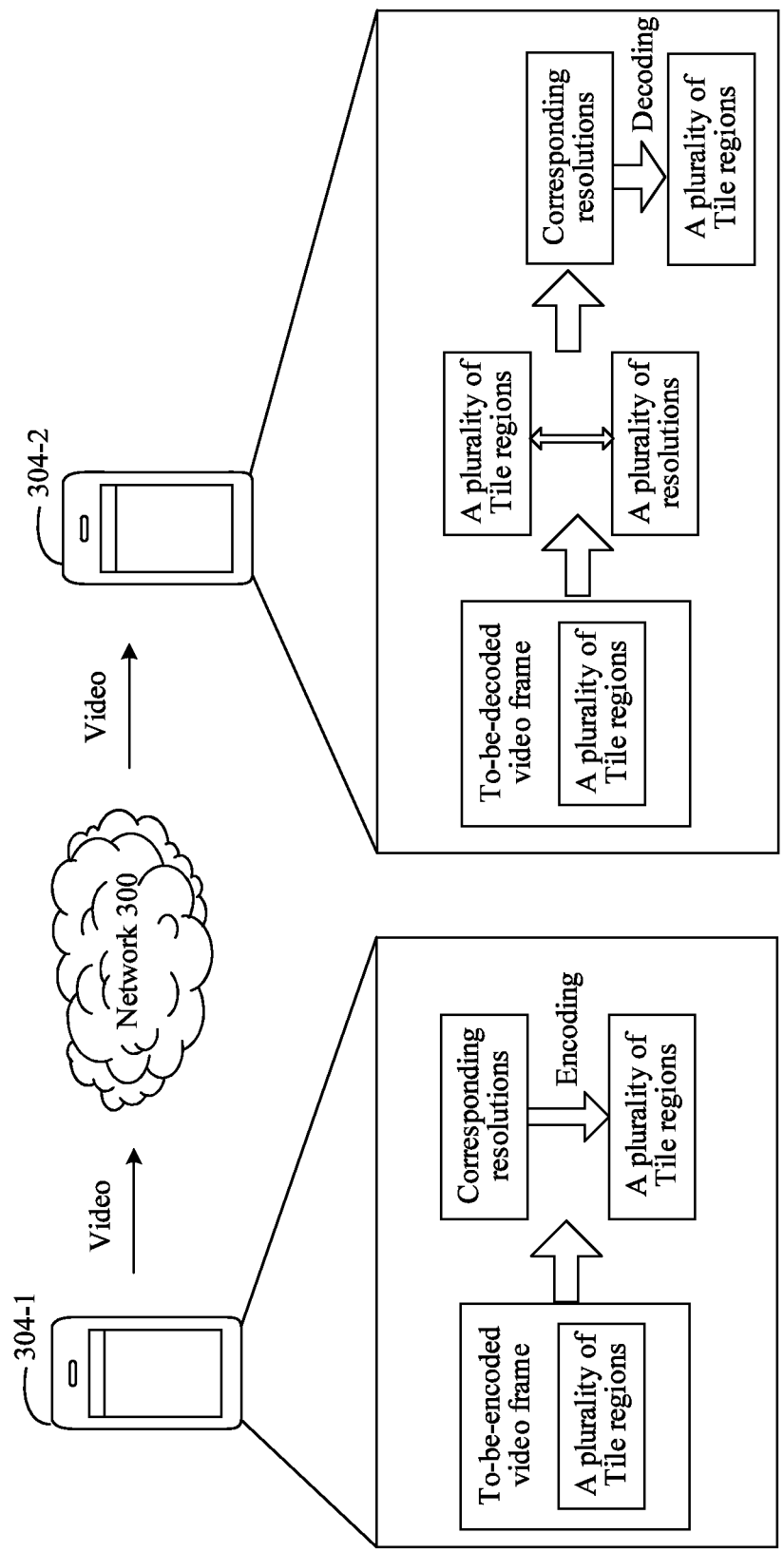
FIG. 3A is a schematic diagram of an application scenario of a video encoding and decoding system according to an embodiment of this application.

FIG. 3A is a schematic diagram of an application scenario of a video encoding and decoding system 10 according to an embodiment of this application. A terminal 304-1 is connected to a terminal 304-2 by using a network 300. The network 300 may be a wide area network or a local area network, or a combination thereof.

In some embodiments, as shown in FIG. 3A, after acquiring a to-be-encoded video (including a plurality of current video frames), the terminal 304-1 determines a resolution corresponding to each Tile region in a plurality of Tile regions in the current video frame to obtain at least two different resolutions; and encodes the Tile region based on the resolution corresponding to the Tile region, to obtain encoded data (an encoded video frame) of the current video frame. The terminal 304-1 sends the encoded video frame (that is, a current video frame) to the terminal 304-2. The terminal 304-2 obtains the current video frame, determines a resolution corresponding to each Tile region in a plurality of Tile regions in the current video frame to obtain at least two different resolutions; and decodes the Tile region based on the resolution corresponding to the Tile region, to obtain a decoded video frame, and plays the video.

The foregoing video encoding method and video decoding method may be applied to, but not limited to, a scenario of audio and video processing. For example, the terminal 304-1 (on which a client A runs) and the terminal 304-2 (on which a client B runs) make a video call. The client A and the client B separately acquire video pictures, encode the acquired video pictures, and send the encoded video to the other party. The other party decodes the received video and plays the decoded video.

In some embodiments, the foregoing video encoding method and video decoding method may be further applied to, but not limited to, scenarios such as the playback of video files and live video streaming.

The foregoing client may be, but not limited to, various applications, for example, an on-line education application, an instant messaging application, a community space application, a game application, a shopping application, a browser application, a financial application, a multimedia application, and a live broadcast application. In some embodiments, the client may be applied to, but not limited to, a scenario in which audio and videos are processed in the foregoing instant messaging application, or may be applied to, but not limited to, a scenario in which audio and videos are processed in the foregoing multimedia application, to avoid large fluctuations in a PSNR of video encoding and decoding. This is merely an example and is not limited in this embodiment of this application.

Figure 2:
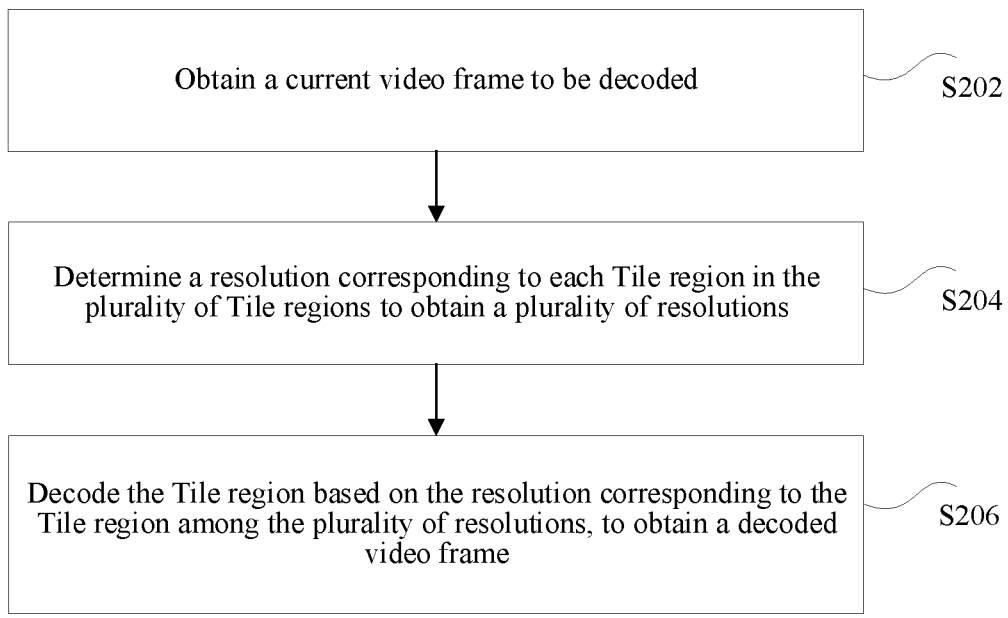
FIG. 2 is a schematic diagram of a video decoding method according to an embodiment of this application.

An embodiment of this application provides a video decoding method. As shown in FIG. 2, the method includes:

S202. Obtain a current video frame, the current video frame being divided into a plurality of tile-divided Tile regions.

S204. Determine a resolution corresponding to each Tile region in the plurality of Tile regions to obtain a plurality of resolutions, the plurality of resolutions including at least two different resolutions. In some embodiments, the plurality of resolutions are determined according to a transmission bandwidth of a video stream including the current video frame from a source (e.g., a client terminal 304-1) to a destination (e.g., a client terminal 304-2), e.g., by comparing the transmission bandwidth with a preset bandwidth threshold.

S206. Decode the Tile region based on the resolution corresponding to the Tile region among the plurality of resolutions, to obtain a decoded video frame.

Figure 3B:
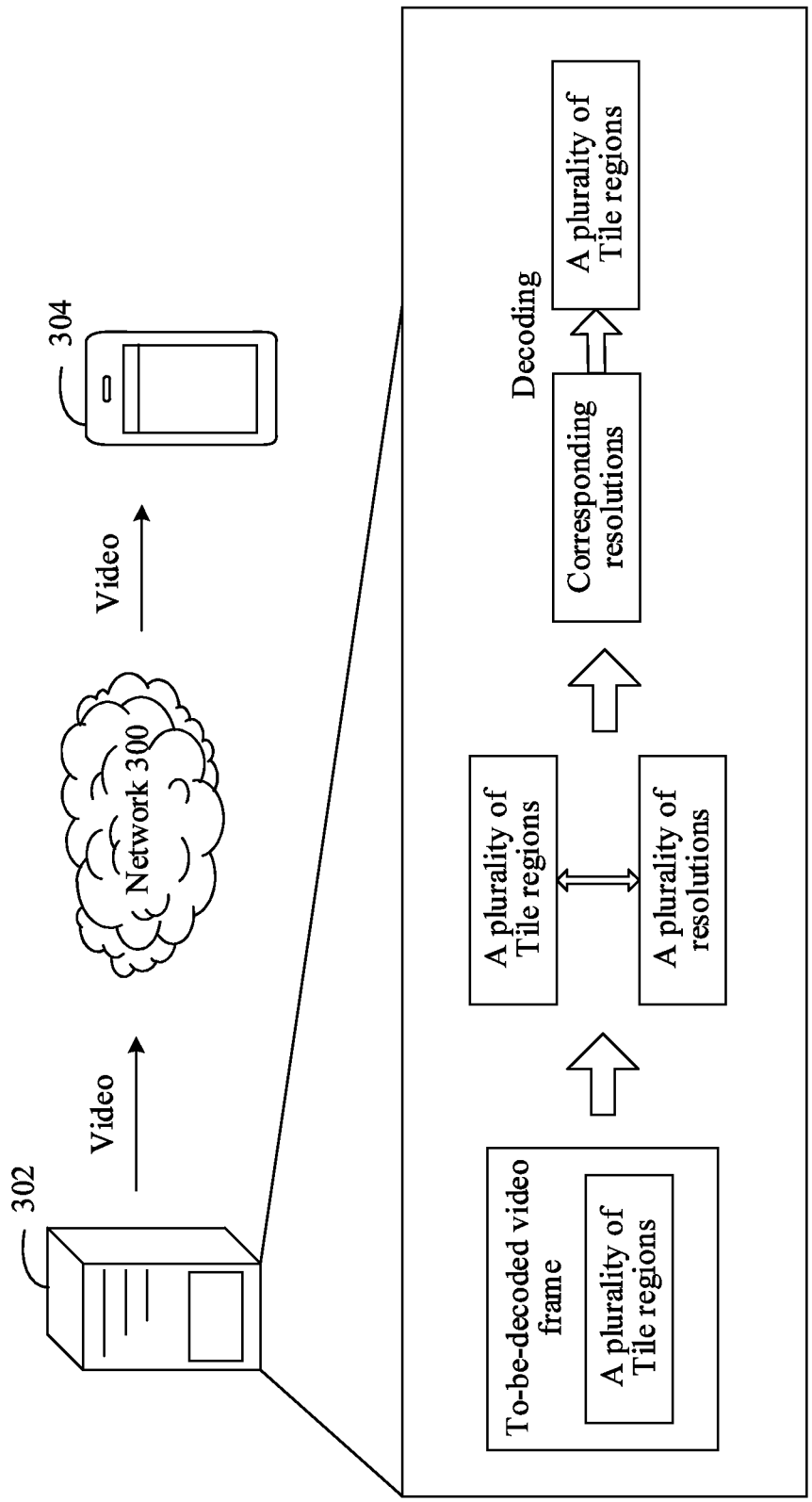
FIG. 3B is a schematic diagram of an application environment of a video decoding method according to an embodiment of this application.

In this embodiment of this application, the video decoding method may be applied to a hardware environment including a server 302 and a terminal 304 (on which a client runs) shown in FIG. 3B. As shown in FIG. 3B, the server 302 obtains a current video frame, determines a resolution corresponding to each Tile region in a plurality of Tile regions to obtain a plurality of resolutions, and decodes the Tile region in the plurality of Tile regions by using the corresponding resolution among the plurality of resolutions, to obtain a decoded video frame. All decoded video frames form a decoded video. The server 302 sends the decoded video to the terminal 304 for playback.

Figure 4:
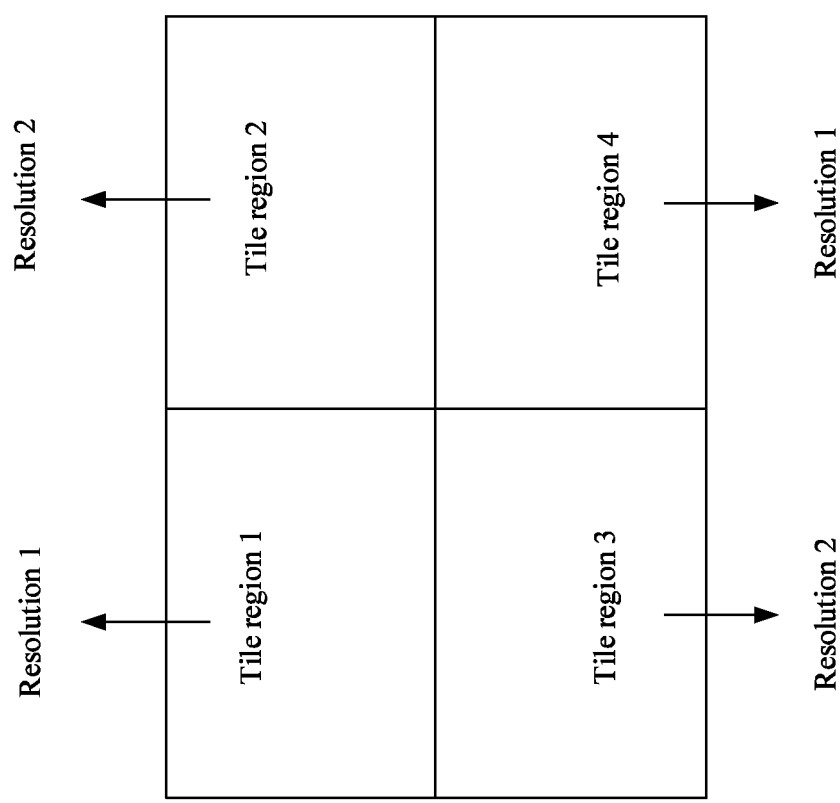
FIG. 4 is a first schematic diagram of a video decoding method according to an implementation of this application.

As shown in FIG. 4, the current video frame includes a Tile region 1, a Tile region 2, a Tile region 3, and a Tile region 4. A resolution corresponding to the Tile region 1 is a resolution 1, a resolution corresponding to the Tile region 2 is a resolution 2, a resolution corresponding to the Tile region 3 is the resolution 2, and a resolution corresponding to the Tile region 4 is the resolution 1. That is, a corresponding resolution is determined for each Tile region to obtain a plurality of resolutions. The plurality of resolutions include the resolution 1 and the resolution 2.

In this embodiment of this application, the video decoding method may be applied to, but not limited to, a scenario of audio and video processing. For example, a client A and a client B make a video call. The client A and the client B separately acquire video images, encode the acquired video images, and send the encoded video to the other party. The other party decodes the received video and plays the decoded video.

In this embodiment of this application, the video decoding method may be further applied to, but not limited to, scenarios such as the playback of video files and live video streaming.

The foregoing client may be, but is not limited to, various applications, for example, an on-line education application, an instant messaging application, a community space application, a game application, a shopping application, a browser application, a financial application, a multimedia application, and a live broadcast application. In some embodiments, the client may be applied to, but not limited to, a scenario in which audio and videos are processed in the foregoing instant messaging application, or may be applied to, but not limited to, a scenario in which audio and videos are processed in the foregoing multimedia application, to avoid large fluctuations in a PSNR of video encoding and decoding. This is merely an example and is not limited in this embodiment of this application.

In this embodiment of this application, the plurality of Tile regions included in the current video frame are encoded by using at least two different resolutions.

As shown in FIG. 4, the current video frame is obtained, where the current video frame is divided into the plurality of Tile regions, including: the Tile region 1, the Tile region 2, the Tile region 3, and the Tile region 4. It may be determined that the resolution corresponding to the Tile region 1 is the resolution 1, the resolution corresponding to the Tile region 2 is the resolution 2, the resolution corresponding to the Tile region 3 is the resolution 2, and the resolution corresponding to the Tile region 4 is the resolution 1. The Tile region 1 is decoded by using the resolution 1; the Tile region 2 is decoded by using the resolution 2; the Tile region 3 is decoded by using the resolution 2; and the Tile region 4 is decoded by using the resolution 1. That is, the resolution 1 and the resolution 2 are at least two different resolutions included in the plurality of resolutions.

The current video frame may be divided into a plurality of even Tile regions. As shown in FIG. 4, the Tile region 1, the Tile region 2, the Tile region 3, and the Tile region 4 are Tile regions with the same area. Alternatively, the current video frame may be divided into a plurality of uneven Tile regions. For example, a higher resolution corresponding to a Tile region indicates a smaller area of the Tile region, that is, the area of the Tile region is related to the resolution corresponding to the Tile region.

For example, the current video frame may be divided into a plurality of Tile regions. Some Tile regions in the plurality of Tile regions have a partially crossed region. The partially crossed region is decoded by using the same resolution, to avoid an obvious seam caused after the partially crossed region is decoded by using different resolutions. For example, a current video frame includes a Tile region 1, a Tile region 2, a Tile region 3, and a Tile region 4, where the Tile region 1 and the Tile region 2 have a partially crossed region, that is, the Tile region 1 and the Tile region 2 do not completely overlap. The partially crossed region of the Tile region 1 and the Tile region 2 is decoded by using the resolution 2.

As can be seen, through the foregoing steps, different blocks in a frame of a video are adaptively encoded by using corresponding resolutions. In this way, regardless of whether a transmission bandwidth is relatively small or whether the transmission bandwidth is relatively large, a corresponding PSNR is relatively large, and the distortion is relatively small, thereby ensuring that the PSNR can change within a small range. In addition, the PSNR is relatively large, thereby achieving a technical effect of avoiding large fluctuations in the PSNR of video encoding and decoding, and further resolving the technical problem of large fluctuations in the PSNR due to the use of the same resolution for video encoding and decoding in the related art.

In some embodiments, the determining a resolution corresponding to each Tile region in the plurality of Tile regions includes:

S1. Determine at least two different resolutions for different Tile regions in the plurality of Tile regions.

In this embodiment of this application, at least two resolutions among the resolutions determined for the different Tile regions in the plurality of Tile regions are different. In other words, the resolutions determined for the different Tile regions in the plurality of Tile regions may be completely different, that is, each Tile region corresponds to a resolution, and each Tile region is different. Alternatively, resolutions corresponding to different Tile regions may be the same, but resolutions of the plurality of Tile regions are not completely the same. For example, the resolution of the Tile region in the plurality of Tile regions may be selected from a resolution set, and different resolutions may be selected for the Tile regions from the resolution set, or at least two different resolutions may be selected.

In some embodiments, the determining a resolution corresponding to each Tile region in the plurality of Tile regions includes:

S1. Obtain flag bit data corresponding to each Tile region in the plurality of Tile regions from a syntactic element of the current video frame, the flag bit data being used for identifying the resolution corresponding to the Tile region.

In this embodiment of this application, the resolution corresponding to the Tile region may be added to the syntactic element by, but not limited to, an encoder side and transmitted to a decoder side. A correspondence between a Tile region and a resolution is indicated by using flag bit data in the syntactic element, so that the decoder side decodes the Tile region by using the resolution corresponding to the region.

In this embodiment of this application, the syntactic element used for indicating the resolution used in encoding the Tile region may be a piece of data located at a fixed position of the current video frame. At the position, different data values represent different resolutions. The syntactic element representing the resolution corresponding to the Tile region may be added at this position.

For example, the fixed position of the current video frame may be a position corresponding to an $x^{th}$ byte to a $y^{th}$ byte in a header of encapsulated data used for encapsulating the current video frame, where x and y are natural numbers, the encapsulated data includes a data body and the header, the data body is used for storing the current video frame, and the header is used for storing a timestamp, custom data, and the like of the current video frame. For example, the $x^{th}$ byte to the $y^{th}$ byte in the header store a resolution used for decoding. When the current video frame needs to be decoded, the encapsulated data is parsed, and the flag bit data is obtained through the $x^{th}$ byte to the $y^{th}$ byte in the header, so that the decoder side decodes the Tile region by using the resolution corresponding to the Tile region according to the correspondence that is between the Tile region and the resolution and that is indicated by using the flag bit data.

In this embodiment of this application, during the reconstruction of the video, at least one pair of decoding regions to be reconstructed is determined in the current video frame, where each pair of decoding regions in the at least one pair of decoding regions includes a first decoding region using a resolution A and a second decoding region using a resolution B, and the first decoding region and the second decoding region are decoding regions with adjacent positions;

the resolution A of the first decoding region is adjusted to a target resolution, and the resolution B of the second decoding region is adjusted to the target resolution;

a first edge pixel set is determined in the first decoding region, and a second edge pixel set is determined in the second decoding region, where a position of the first edge pixel set is adjacent to a position of the second edge pixel set;

the first edge pixel set is filtered to obtain the filtered first edge pixel set, and the second edge pixel set is filtered to obtain the filtered second edge pixel set, where the filtered first edge pixel set matches the filtered second edge pixel set.

A first difference between a pixel value of an $i^{th}$ pixel in the filtered first edge pixel set and a pixel value of a $i^{th}$ pixel in the filtered second edge pixel set is determined, where i is a positive integer, j is a positive integer, and the $i^{th}$ pixel corresponds to the $i^{th}$ pixel. A second difference between a pixel value of an $i^{th}$ pixel in the first edge pixel set and a pixel value of a $j^{th}$ pixel in the second edge pixel set is determined. The first difference is less than the second difference, is less than or equal to a total number of pixels in the first edge pixel set, and is less than or equal to a total number of pixels in the second edge pixel set.

The adjustment to the target resolution includes:

1) When the target resolution is equal to the resolution A, the resolution B is adjusted to the resolution A.

2) When the target resolution is equal to the resolution B, the resolution A is adjusted to the resolution B.

3) When the target resolution is equal to a resolution C, the resolution A is adjusted to the resolution C, and the resolution B is adjusted to the resolution C, where the resolution C is different from the resolution A and different from the resolution B.

Edge filtering can be performed only after the resolutions are unified. The resolution adjustment is performed on the foregoing decoding regions, and the edge filtering processing is performed on the edge pixel sets determined in the decoding regions, to avoid obvious seams in the video during the reconstruction, thereby ensuring accurate restoration of content in the video, and further resolving the technical problem of video distortion caused by inconsistent resolutions.

Figure 5:
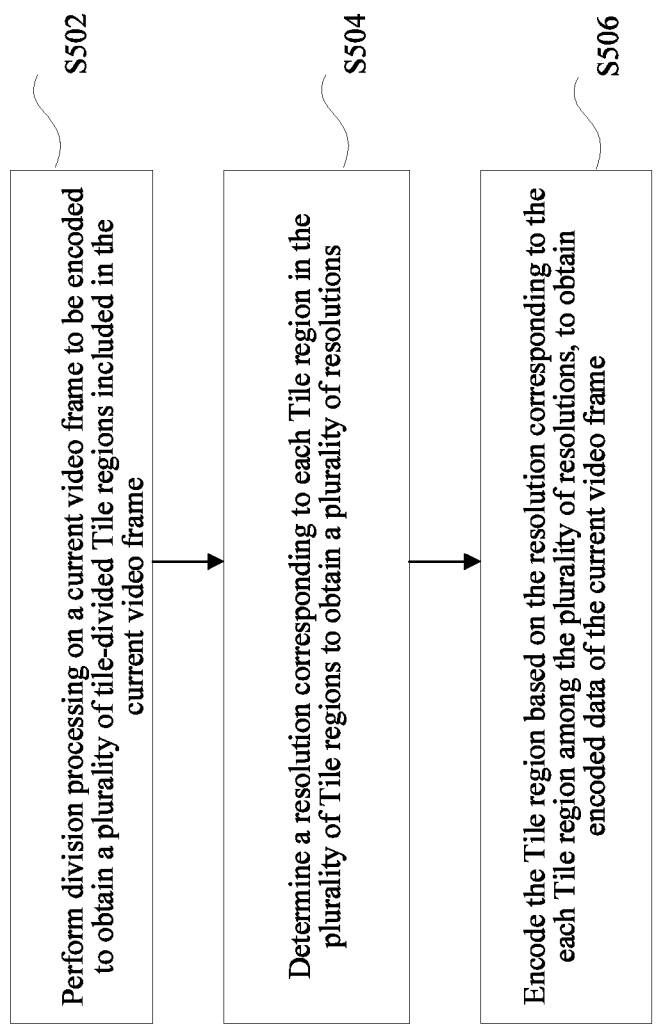
FIG. 5 is a schematic diagram of a video decoding method according to an embodiment of this application.

An embodiment of this application provides a video encoding method. As shown in FIG. 5, the method includes:

S502. Perform division processing on a current video frame to obtain a plurality of tile-divided Tile regions included in the current video frame.

S504. Determine a resolution corresponding to each Tile region in the plurality of Tile regions to obtain a plurality of resolutions, the plurality of resolutions including at least two different resolutions. In some embodiments, the plurality of resolutions are determined according to a transmission bandwidth of a video stream including the current video frame from a source (e.g., a client terminal 604) to a destination (e.g., a video server 602), e.g., by comparing the transmission bandwidth with a preset bandwidth threshold.

S506. Encode the Tile region based on the resolution corresponding to the Tile region among the plurality of resolutions, to obtain encoded data of the current video frame.

Encoding technologies of this embodiment of this application include lossless compression encoding technologies (for example, Huffman coding, Shannon coding, run-length encoding (RLC), Lempel-Ziv-Welch (LZW) encoding, and arithmetic coding), and lossy compression encoding technologies (for example, predictive coding, transform coding, quantization coding, and sub-band coding). Decoding technologies of this embodiment of this application correspond to the encoding technologies used.

Figure 6:
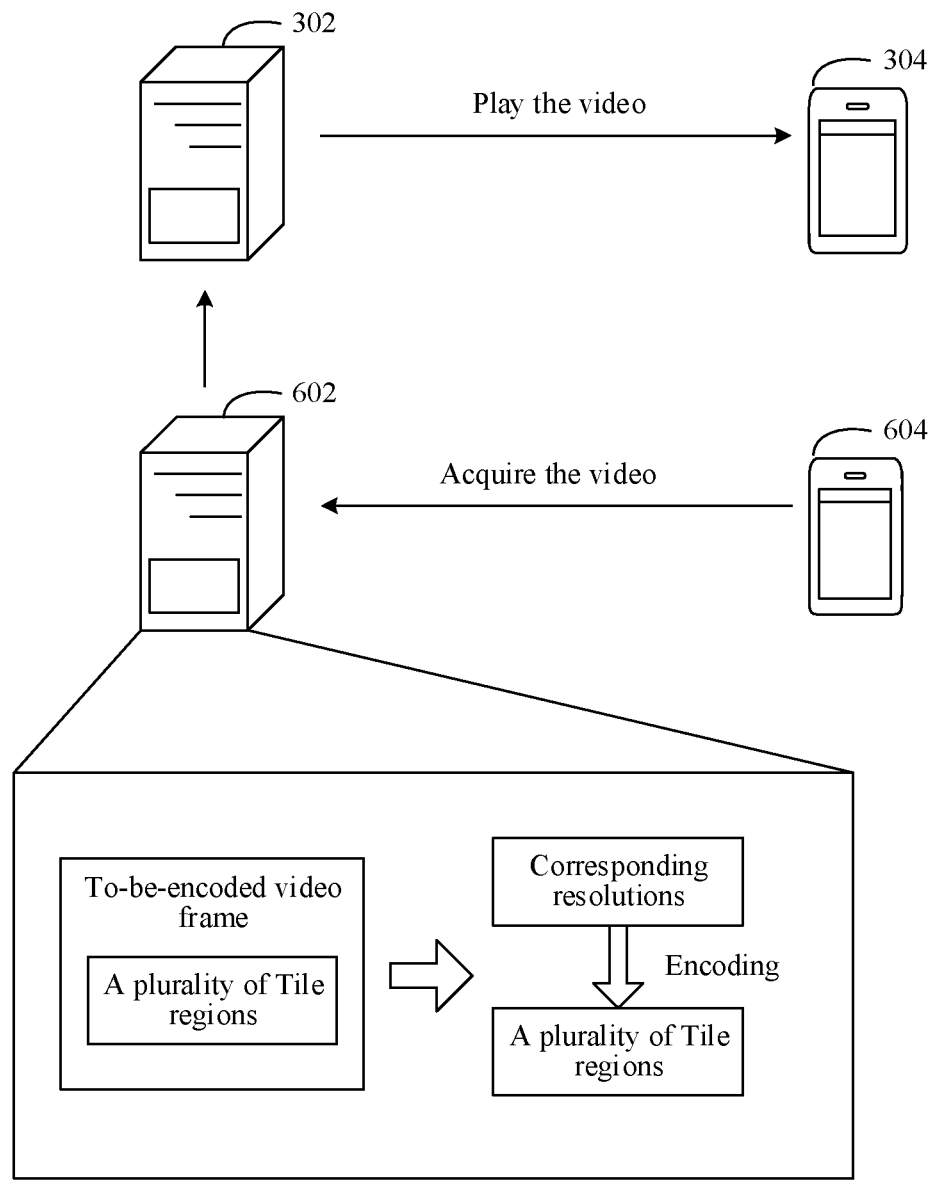
FIG. 6 is a schematic diagram of an application environment of a video decoding method according to an embodiment of this application.

In this embodiment of this application, the video encoding method may be applied to a hardware environment including a server 602, a server 302, a terminal 604 (on which a client runs), and a terminal 304 (client) shown in FIG. 6. As shown in FIG. 6, the server 602 obtains a current video frame acquired by the terminal 604, the current video frame being divided into a plurality of Tile regions; determines a resolution corresponding to each Tile region in the plurality of Tile regions to obtain a plurality of resolutions, the plurality of resolutions including at least two different resolutions; and encodes the Tile region in the plurality of Tile regions by using the corresponding resolution among the plurality of resolutions, to obtain encoded data of the current video frame. Encoded data of all current video frames forms an encoded video. The server 602 sends the encoded video to the server 302 for decoding, and the server 302 sends the decoded video to the client 304 for playback.

For example, the current video frame includes a Tile region 1, a Tile region 2, a Tile region 3, and a Tile region 4. A resolution corresponding to the Tile region 1 is a resolution 1, a resolution corresponding to the Tile region 2 is a resolution 2, a resolution corresponding to the Tile region 3 is the resolution 2, and a resolution corresponding to the Tile region 4 is the resolution 1. That is, a corresponding resolution is determined for each Tile region to obtain a plurality of resolutions. The plurality of resolutions include the resolution 1 and the resolution 2.

In this embodiment of this application, the video encoding method may be applied to, but not limited to, a scenario of audio and video processing. For example, a client A and a client B make a video call. The client A and the client B separately acquire video images, encode the acquired video images, and send the encoded video to the other party. The other party decodes the received video and plays the decoded video.

In this embodiment of this application, the video encoding method may be further applied to, but not limited to, scenarios such as the playback of video files and live video streaming.

The foregoing client may be, but not limited to, various applications, for example, an on-line education application, an instant messaging application, a community space application, a game application, a shopping application, a browser application, a financial application, a multimedia application, and a live broadcast application. In some embodiments, the client may be applied to, but not limited to, a scenario in which audio and videos are processed in the foregoing instant messaging application, or may be applied to, but not limited to, a scenario in which audio and videos are processed in the foregoing multimedia application, to avoid large fluctuations in a PSNR of video encoding and decoding. This is merely an example and is not limited in this embodiment of this application.

In this embodiment of this application, different Tile regions in the current video frame are encoded by using different resolutions. For example, the current video frame is divided into four Tile regions: a Tile region 1, a Tile region 2, a Tile region 3, and a Tile region 4. It is determined that the Tile region 1 corresponds to a resolution 1, the Tile region 2 and the Tile region 3 correspond to a resolution 2, and the Tile region 4 corresponds to a resolution 3. The Tile region 1 is encoded by using the resolution 1; the Tile region 2 and the Tile region 3 are encoded by using the resolution 2; and the Tile region 4 is encoded by using the resolution 3. That is, the resolution 1 and the resolution 2 are at least two different resolutions included in the plurality of resolutions.

The current video frame may be divided into a plurality of even Tile regions. For example, the Tile region 1, the Tile region 2, the Tile region 3, and the Tile region 4 are Tile regions with the same area. The current video frame may be divided into a plurality of uneven Tile regions. For example, a higher resolution corresponding to a Tile region indicates a smaller area of the Tile region, that is, the area of the Tile region is related to the resolution corresponding to the Tile region.

For example, the current video frame may be divided into a plurality of Tile regions. Some Tile regions in the plurality of Tile regions have a partially crossed region. The partially crossed region is encoded by using the same resolution, to avoid an obvious seam in a subsequent decoding process. For example, a current video frame includes a Tile region 1, a Tile region 2, a Tile region 3, and a Tile region 4, where the Tile region 1 and the Tile region 2 have a partially crossed region, that is, the Tile region 1 and the Tile region 2 do not completely overlap. The partially crossed region of the Tile region 1 and the Tile region 2 is encoded by using the resolution 2.

In this embodiment of this application, the plurality of Tile regions included in the current video frame are encoded by using at least two different resolutions.

As can be seen, through the foregoing steps, different regions in a frame of a video are adaptively encoded by using corresponding resolutions. In this way, regardless of whether a transmission bandwidth is relatively small or whether the transmission bandwidth is relatively large, a corresponding PSNR is relatively large, and the distortion is relatively small, thereby ensuring that the PSNR can change within a small range. In addition, the PSNR is relatively large, thereby achieving a technical effect of avoiding large fluctuations in the PSNR of video encoding and decoding, and further resolving the technical problem of large fluctuations in the PSNR due to the use of the same resolution for video encoding and decoding in the related art.

In some embodiments, the determining a resolution corresponding to each Tile region in the plurality of Tile regions includes:

performing the following processing on the Tile region in the plurality of Tile regions:

S1. Determine, for each resolution in a resolution set, a rate distortion cost of encoding the Tile region.

S2. Determine a resolution corresponding to a smallest rate distortion cost as the resolution corresponding to the Tile region.

In this embodiment of this application, a manner of determining the resolution corresponding to the Tile region is to provide a resolution set, calculate a rate distortion cost of encoding a current Tile region for each resolution in the resolution set, and determine a resolution corresponding to a calculated smallest rate distortion cost as the resolution corresponding to the current Tile region.

In some embodiments, the determining a resolution corresponding to each Tile region in the plurality of Tile regions includes:

S1. Obtain an inputted resolution determining instruction, the resolution determining instruction being used for indicating the resolution corresponding to the Tile region.

S2. Determine the resolution indicated by the resolution determining instruction as the resolution corresponding to the Tile region.

In this embodiment of this application, a manner of determining the resolution corresponding to the Tile region is to indicate the resolution corresponding to the Tile region through a resolution determining instruction.

In some embodiments, the determining a resolution corresponding to each Tile region in the plurality of Tile regions includes:

S1. Determine at least two different resolutions for different Tile regions in the plurality of Tile regions.

In this embodiment of this application, at least two resolutions among the resolutions determined for the different Tile regions in the plurality of Tile regions are different. In other words, the resolutions determined for the different Tile regions in the plurality of Tile regions may be completely different, that is, each Tile region corresponds to a resolution, and each Tile region is different. Alternatively, resolutions corresponding to different Tile regions may be the same, but resolutions of the plurality of Tile regions are not completely the same. For example, the resolution of the Tile region in the plurality of Tile regions may be selected from a resolution set, and different resolutions may be selected for the Tile regions from the resolution set, or at least two different resolutions may be selected.

In some embodiments, the determining a resolution corresponding to each Tile region in the plurality of Tile regions includes:

S1. Encode the Tile region based on the resolution corresponding to the Tile region among the plurality of resolutions, to obtain encoded data corresponding to the Tile region.

S2. Determine flag bit data corresponding to the encoded data corresponding to the Tile region, the flag bit data being used for identifying the resolution corresponding to the Tile region.

S3. Add the flag bit data as a syntactic element to the encoded data corresponding to the Tile region.

In this embodiment of this application, a resolution used in encoding each Tile region may be indicated by adding flag bit data. For example, the current video frame is divided into the four Tile regions: the Tile region 1, the Tile region 2, the Tile region 3, and the Tile region 4. The Tile region 1 is encoded by using the resolution 1, and a syntactic element used for representing the resolution 1 is added to the Tile region 1; the Tile region 2 and the Tile region 3 are encoded by using the resolution 2, and a syntactic element used for representing the resolution 2 is added to each of the Tile region 2 and the Tile region 3; and the Tile region 4 is encoded by using the resolution 3, and a syntactic element used for representing the resolution 3 is added to the Tile region 4.

In this embodiment of this application, the syntactic element used for indicating the resolution used in encoding the Tile region may be a piece of data located at a fixed position of the encoded data. At the position, different data values represent different resolutions. The syntactic element representing the resolution corresponding to the Tile region may be added at this position.

For example, the fixed position of the encoded data may be a position corresponding to an xth byte to a yth byte in a header of encapsulated data used for encapsulating the encoded data, where x and y are natural numbers, the encapsulated data includes a data body and the header, the data body is used for storing the encoded data, and the header is used for storing a timestamp, custom data, and the like of the encoded data. For example, the xth byte to the yth byte in the header store a resolution used for encoding and decoding. When the current video frame needs to be decoded, the encapsulated data is parsed, and the flag bit data is obtained through the xth byte to the yth byte in the header, so that a decoder side decodes the Tile region by using the resolution corresponding to the Tile region according to a correspondence that is between the Tile region and the resolution and that is indicated by using the flag bit data.

In this embodiment of this application, different identification values may be directly used in syntactic elements to indicate different resolutions. For example, the resolution 1 is represented by 00, the resolution 2 is represented by 01, the resolution 3 is represented by 10, and the resolution 4 is represented by 11. The manner in which an identification value is used to represent a resolution is not limited thereto. Various identification value representation manners that can distinguish resolutions may be used to indicate different resolutions used in different regions.

In this embodiment of this application, the flag bit data may be determined in, but not limited to, the following manners:

S1. Determine an identification value corresponding to the Tile region according to a relationship between the resolution corresponding to the Tile region and a resolution corresponding to a previous Tile region of the Tile region.

S2. Determine the identification value corresponding to the Tile region as the flag bit data.

In this embodiment of this application, an identification value corresponding to a current Tile region may be used to indicate a relationship between a resolution of the current Tile region and a resolution of a previous Tile region of the current Tile region. The identification value corresponding to the Tile region is determined according to the relationship between the resolution of the current Tile region and the resolution of the previous Tile region.

In some embodiments, the determining an identification value corresponding to the Tile region according to a relationship between the resolution corresponding to the Tile region and a resolution corresponding to a previous Tile region of the Tile region includes:

S1. Determine the identification value corresponding to the Tile region as a first identification value in a case that the resolution corresponding to the Tile region is the same as the resolution corresponding to the previous Tile region of the Tile region.

S2. Determine the identification value corresponding to the Tile region as a second identification value in a case that the resolution corresponding to the Tile region is different from the resolution corresponding to the previous Tile region of the Tile region.

In this embodiment of this application, the relationship between the resolutions may include, but is not limited to: the resolutions are the same or the resolutions are different. The first identification value is used to indicate that the resolutions are the same, and the second identification value is used to indicate that the resolutions are different. For example, 1 is used to indicate that the resolutions are the same, and 0 is used to indicate that the resolutions are different; or 0 is used to indicate that the resolutions are the same, and 1 is used to indicate that the resolutions are different.

In this embodiment of this application, for the first Tile region in each frame, an identification value may be used to directly indicate a resolution used by the Tile region, or an identification value may be further used to indicate a relationship between resolutions of the Tile region and a last Tile region in a previous frame.

In this embodiment of this application, the flag bit data of the Tile region may be alternatively determined according to a relationship between a first resolution corresponding to the Tile region and a second resolution of a reference Tile region corresponding to the Tile region in a reference video frame of the current video frame.

In some embodiments, the determining the flag bit data of the Tile region according to a relationship between a first resolution corresponding to the Tile region and a second resolution of a reference Tile region corresponding to the Tile region in a reference video frame of the current video frame includes:

S1. Determine the identification value corresponding to the Tile region according to the relationship between the first resolution corresponding to the Tile region and the second resolution of the reference Tile region.

S2. Determine the identification value corresponding to the Tile region as the flag bit data.

In this embodiment of this application, the relationship between the resolutions may be represented by using an identification value. The identification value may indicate whether the resolutions are the same, a difference between levels corresponding to the resolutions, and the like.

In this embodiment of this application, the identification value corresponding to the Tile region may be added to a position of the flag bit data.

In some embodiments, the determining the identification value corresponding to the Tile region according to the relationship between the first resolution corresponding to the Tile region and the second resolution of the reference Tile region includes:

S1. Determine the identification value corresponding to the Tile region as the first identification value in a case that the first resolution corresponding to the Tile region is the same as the second resolution corresponding to the reference Tile region.

S2. Determine the identification value corresponding to the Tile region as the second identification value in a case that the first resolution corresponding to the Tile region is different from the second resolution corresponding to the reference Tile region.

In this embodiment of this application, if the resolution of the Tile region is the same as the resolution of the reference Tile region, the identification value corresponding to the Tile region may be represented by the first identification value. If the resolution of the Tile region is different from the resolution of the reference Tile region, the identification value corresponding to the Tile region may be represented by the second identification value. For example, 1 represents that the resolution of the Tile region is the same as the resolution of the reference Tile region, and 0 represents that the resolution of the Tile region is different from the resolution of the reference Tile region. Alternatively, 1 represents that the resolution of the Tile region is different from the resolution of the reference Tile region, and 0 represents that the resolution of the Tile region is the same as the resolution of the reference Tile region.

In some embodiments, the determining the identification value corresponding to the Tile region according to the relationship between the first resolution corresponding to the Tile region and the second resolution of the reference Tile region includes:

S1. Determine a fourth identification value corresponding to the first resolution corresponding to the Tile region among a plurality of identification values, and a third identification value corresponding to the second resolution corresponding to the reference Tile region among the plurality of identification values, different resolutions among the plurality of resolutions being corresponding to different identification values among the plurality of identification values.

S2. Perform an operation on the third identification value and the fourth identification value, and determine an operation result as the identification value corresponding to the Tile region.

In this embodiment of this application, different resolutions in the plurality of resolutions correspond to different identification values in the plurality of identification values, that is, the resolution of the Tile region and the resolution of the reference Tile region correspond to respective identification values in the plurality of identification values. For example, the resolution of the Tile region corresponds to the fourth identification value, and the resolution of the reference Tile region corresponds to the third identification value. A difference between the third identification value and the fourth identification value may be determined as the identification value corresponding to the Tile region, that is, the flag bit data.

In this embodiment of this application, a second syntactic element may be further added to encoded data corresponding to the Tile region. The second syntactic element is used for indicating a position of the reference video frame.

In this embodiment of this application, the second syntactic element may be used to indicate the position of the reference video frame, and the decoder side may determine and obtain the reference video frame according to the indication of the second syntactic element. For example, the second syntactic element may indicate a distance between a current video frame and the reference video frame.

For ease of description, the foregoing method embodiments are stated as a series of action combinations. However, a person skilled in the art is to learn that this application is not limited to the described sequence of the actions because according to this application, some steps may be performed in another sequence or may be simultaneously performed. In addition, a person skilled in the art is also to learn that the embodiments described in this specification are all exemplary embodiments, and the involved actions and modules are not necessarily required to this application.

Figure 7:
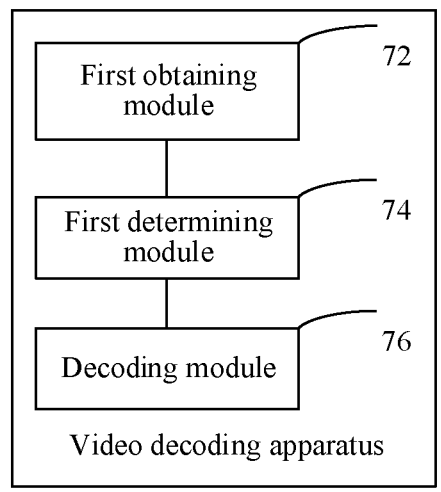
FIG. 7 is a schematic diagram of a video decoding apparatus according to an embodiment of this application.

An embodiment of this application further provides a video decoding apparatus for implementing the foregoing video decoding method. As shown in FIG. 7, the apparatus includes:

a first obtaining module 72, configured to obtain a current video frame, the current video frame being divided into a plurality of tile-divided Tile regions; a first determining module 74, configured to determine a resolution corresponding to each Tile region in the plurality of Tile regions to obtain a plurality of resolutions, the plurality of resolutions including at least two different resolutions; and a decoding module 76, configured to decode the Tile region based on the resolution corresponding to the Tile region among the plurality of resolutions, to obtain a decoded video frame.

In some embodiments, the first determining module includes: a first determining unit, configured to determine at least two different resolutions for different Tile regions of the plurality of Tile regions.

In some embodiments, the first determining module includes: a first obtaining unit, configured to obtain flag bit data corresponding to each Tile region in the plurality of Tile regions from a syntactic element of the current video frame, the flag bit data being used for identifying the resolution corresponding to the Tile region.

Figure 8:
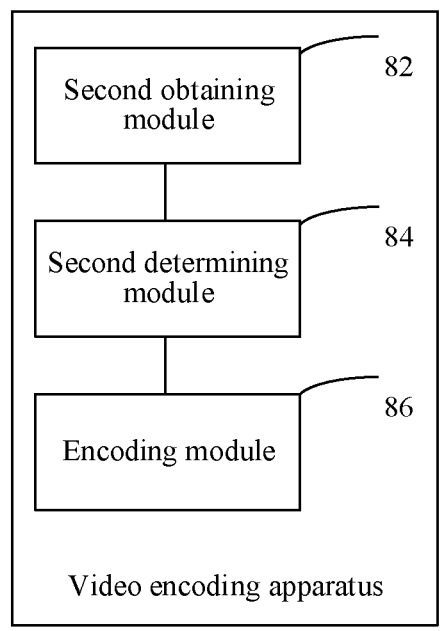
FIG. 8 is a schematic diagram of a video encoding apparatus according to an embodiment of this application.

An embodiment of this application further provides a video encoding apparatus for implementing the foregoing video encoding method. As shown in FIG. 8, the apparatus includes:

a second obtaining module 82, configured to perform division processing on a current video frame to obtain a plurality of Tile regions included in the current video frame; a second determining module 84, configured to determine a resolution corresponding to each Tile region in the plurality of Tile regions to obtain a plurality of resolutions, the plurality of resolutions including at least two different resolutions; and an encoding module 86, configured to encode the Tile region based on the resolution corresponding to the Tile region among the plurality of resolutions, to obtain encoded data of the current video frame.

In some embodiments, the second determining module is configured to perform the following processing on the Tile region in the plurality of Tile regions: determining, for each resolution in a resolution set, a rate distortion cost of encoding the Tile region; and determining a resolution corresponding to a smallest rate distortion cost as the resolution corresponding to the Tile region.

In some embodiments, the second determining module includes: a second obtaining unit, configured to obtain an inputted resolution determining instruction, the resolution determining instruction being used for indicating the resolution corresponding to the Tile region; and a second determining unit, configured to determine the resolution indicated by the resolution determining instruction as the resolution corresponding to the Tile region.

In some embodiments, the second determining module includes: a third determining unit, configured to determine at least two different resolutions for different Tile regions of the plurality of Tile regions.

In some embodiments, the encoding module includes: an encoding unit, configured to encode the Tile region based on the resolution corresponding to the Tile region among the plurality of resolutions, to obtain encoded data corresponding to the Tile region; a fourth determining unit, configured to determine flag bit data corresponding to the encoded data corresponding to the Tile region, the flag bit data being used for identifying the resolution corresponding to the Tile region; and an addition unit, configured to add the flag bit data as a syntactic element to the encoded data corresponding to the Tile region.

Figure 9:
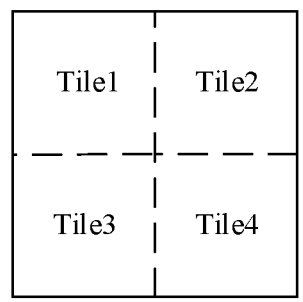
FIG. 9 is a first schematic diagram of an application scenario of a video encoding and decoding method according to an embodiment of this application.

The foregoing video encoding method and video decoding method may be applied to, but not limited to, a scenario of video encoding and decoding processing shown in FIG. 9. In this scenario, for a tth frame to be encoded in the video, a region in the tth frame is divided into different Tile regions, as shown in FIG. 9, including a Tile1 region, a Tile2 region, a Tile3 region, and a Tile4 region. The division manner in FIG. 9 is merely an example, and a quantity and a shape of Tile regions in a frame are not limited in this embodiment of this application. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Different resolutions are used to calculate rate distortion costs in different Tile regions, and a resolution corresponding to a smallest rate distortion cost is used as the resolution used on the Tile regions. For example, for the Tile1 region, a resolution 1, a resolution 2, and a resolution 3 in a predetermined resolution set are separately used to calculate corresponding rate distortion costs, and the resolution 2 corresponds to the smallest rate distortion cost. In this case, the resolution 2 is used to encode blocks in the Tile1 region.

Figure 10:
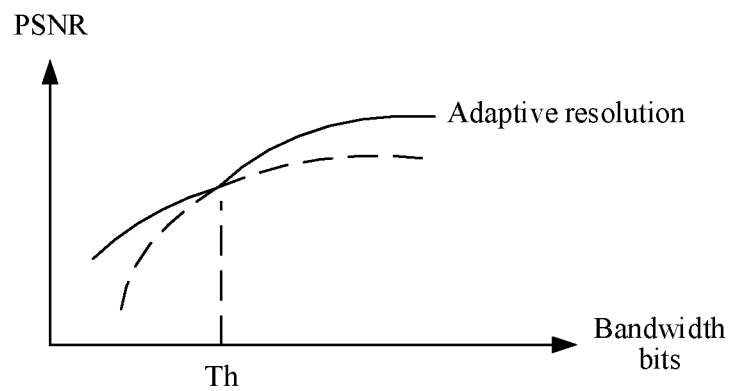
FIG. 10 is a second schematic diagram of an application scenario of a video encoding and decoding method according to an embodiment of this application.

As shown in FIG. 10, in the video encoding process of this application, different blocks in a frame of a video are adaptively encoded by using corresponding resolutions, so that regardless of whether a transmission bandwidth is relatively small (for example, less than a bandwidth threshold Th shown in FIG. 10), or whether the transmission bandwidth is relatively large (for example, larger than the bandwidth threshold Th shown in FIG. 10), corresponding PSNRs are relatively large, and distortion is relatively small.

In addition, because different blocks in a frame of a video are adaptively encoded by using corresponding resolutions, there is no need to select the corresponding resolutions according to an intersection (for example, an intersection in FIG. 1) corresponding to different types of videos or different frames of the same video or different blocks in the same frame during encoding of frames in the video, which reduces encoding complexity.

Figure 11:
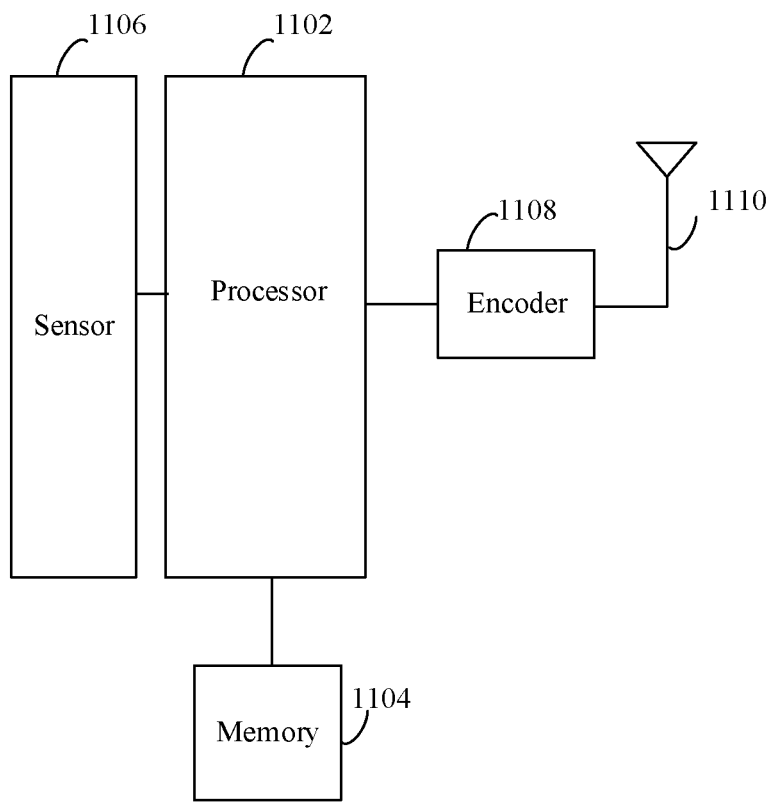
FIG. 11 is a schematic diagram of an electronic device according to an embodiment of this application.

An embodiment of this application further provides an electronic device configured to implement the foregoing video encoding method or video decoding method. As shown in FIG. 11, the electronic device includes one or more (only one is shown in the figure) processors 1102, a memory 1104, a sensor 1106, an encoder 1108, and a transmission apparatus 1110. The memory stores a computer program, and the processor is configured to perform the steps in any one of the foregoing method embodiments through the computer program.

In this embodiment of this application, the electronic device may be located in at least one of a plurality of network devices in a computer network.

In this embodiment of this application, the processor may be configured to perform the following steps through the computer program:

S1. Obtain a current video frame, the current video frame being divided into a plurality of tile-divided Tile regions.

S2. Determine a resolution corresponding to each Tile region in the plurality of Tile regions to obtain a plurality of resolutions, the plurality of resolutions including at least two different resolutions.

S3. Decode the Tile region based on the resolution corresponding to the Tile region among the plurality of resolutions, to obtain a decoded video frame.

In this embodiment of this application, the processor may be further configured to perform the following steps through the computer program:

S1. Perform division processing on a current video frame to obtain a plurality of tile-divided Tile regions included in the current video frame.

S2. Determine a resolution corresponding to each Tile region in the plurality of Tile regions to obtain a plurality of resolutions, the plurality of resolutions including at least two different resolutions.

S3. Encode the Tile region based on the resolution corresponding to the Tile region among the plurality of resolutions, to obtain encoded data of the current video frame.

In some embodiments, a person of ordinary skill in the art may understand that, the structure shown in FIG. 11 is only illustrative. The electronic device may be a terminal device such as a smartphone (for example, an Android phone or an iOS phone), a tablet computer, a palmtop computer, a mobile Internet device (MID), or a PAD. FIG. 11 does not limit the structure of the electronic device. For example, the electronic device may alternatively include more or fewer components (for example, a network interface and a display apparatus) than those shown in FIG. 11, or have a configuration different from that shown in FIG. 11.

The memory 1104 may be configured to store a software program and a module, for example, program instructions/modules corresponding to the video decoding method and apparatus in the embodiments of this application. The processor 1102 runs the software program and the module stored in the memory 1104, to implement various functional applications and data processing, that is, implement the foregoing video encoding method or video decoding method. The memory 1104 may include a high-speed random memory, and may also include a non-volatile memory, for example, one or more magnetic storage apparatuses, a flash memory, or another non-volatile solid-state memory. In some examples, the memory 1104 may include memories remotely disposed relative to the processor 1102, and the remote memories may be connected to a terminal through a network. Examples of the network include, but are not limited to, the Internet, an intranet, a local area network, a mobile communication network and a combination thereof.

The transmission apparatus 1110 is configured to receive or transmit data by using a network. The foregoing network may include a wired network and a wireless network. In an example, the transmission apparatus 1110 includes a network interface controller (NIC). The NIC may be connected to another network device and a router by using a network cable, to communicate with the Internet or a local area network. In an example, the transmission apparatus 1110 is a radio frequency (RF) module, which communicates with the Internet in a wireless manner.

The memory 1104 is configured to store an application program.

An embodiment of this application further provides a non-transitory computer-readable storage medium, the computer-readable storage medium storing a computer program, the computer program being configured to perform steps in any one of the foregoing method embodiments when being run.

In this embodiment of this application, the computer-readable storage medium may be configured to store a computer program for performing the following steps:

S1. Obtain a current video frame, the current video frame being divided into a plurality of tile-divided Tile regions.

S2. Determine a resolution corresponding to each Tile region in the plurality of Tile regions to obtain a plurality of resolutions, the plurality of resolutions including at least two different resolutions.

S3. Decode the Tile region based on the resolution corresponding to the Tile region among the plurality of resolutions, to obtain a decoded video frame.

In some embodiments, the computer-readable storage medium is further configured to store a computer program for performing the following steps:

S1. Perform division processing on a current video frame to obtain a plurality of tile-divided Tile regions included in the current video frame.

S2. Determine a resolution corresponding to each Tile region in the plurality of Tile regions to obtain a plurality of resolutions, the plurality of resolutions including at least two different resolutions.

S3. Encode the Tile region based on the resolution corresponding to the Tile region among the plurality of resolutions, to obtain encoded data of the current video frame.

In some embodiments, the computer-readable storage medium is further configured to store a computer program for performing the steps included in the methods in the foregoing embodiments, and details are not described again in this embodiment of this application.

In this embodiment of this application, a person of ordinary skill in the art may understand that all or some of the steps of the methods in the foregoing embodiments may be implemented by a program instructing relevant hardware of the terminal device. The program may be stored in a computer-readable storage medium, and the computer-readable storage medium may include a flash disk, a read-only memory (ROM), a random access memory (RAM), a magnetic disk, an optical disc, or the like.

The sequence numbers of the foregoing embodiments of this application are merely for description purpose, and are not intended to indicate priorities of the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or a part contributing to the related art, or all or a part of the technical solutions may be implemented in a form of a software product. The computer software product is stored in a computer-readable storage medium and includes several instructions for instructing one or more computer devices (which may be a personal computer, a server, a network device, or the like) to perform all or some of the steps of the methods in the embodiments of this application.

In the foregoing embodiments of this application, the descriptions of the embodiments have respective focuses. For a part that is not described in detail in an embodiment, reference may be made to related descriptions in other embodiments.

In the several embodiments provided in this application, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual needs to achieve the objectives of the solutions of the embodiments of this application.

In addition, functional units in the embodiments of this application may be integrated into one processing unit, or each of the units may be physically separated, or two or more units may be integrated into one unit. The integrated unit may be implemented in the form of hardware, or may be implemented in the form of a software functional unit.

The foregoing descriptions are merely exemplary implementations of this application. A person of ordinary skill in the art may make several improvements and modifications without departing from the principle of this application, and the improvements and modifications shall fall within the protection scope of this application.

INDUSTRIAL APPLICABILITY

In the embodiments of this application, the electronic device obtains the current video frame, determines the different resolution corresponding to the Tile region in the plurality of Tile regions in the current video frame, and decodes the Tile region based on the resolution corresponding to the Tile region, to obtain the decoded video frame. Therefore, regardless of whether a transmission bandwidth is relatively small or whether the transmission bandwidth is relatively large, it is ensured that a PSNR can change within a small range, PSNRs of video encoding and decoding are reduced, and distortion in the video encoding and decoding process is reduced.

What is claimed is:

1. A video decoding method performed by an electronic device, the method comprising:
    obtaining a current video frame, the current video frame being divided into a plurality of tile-divided Tile regions;
    determining a resolution corresponding to each Tile region in the plurality of Tile regions to obtain a plurality of resolutions, comprising at least two different resolutions, wherein:
        a resolution corresponding to each respective Tile region is determined according to a transmission bandwidth of a video stream including the current video frame from a source to the electronic device,
        a first resolution is chosen for the respective Tile region when the transmission bandwidth is less than a threshold corresponding to the respective Tile region,
        a second resolution is chosen for the respective Tile region when the transmission bandwidth is greater than the threshold, and
        the second resolution is higher than the first resolution; and
    decoding each Tile region based on the resolution corresponding to the Tile region among the plurality of resolutions, to obtain a decoded video frame.

2. The method according to claim 1, wherein the determining a resolution corresponding to each Tile region in the plurality of Tile regions comprises:
    obtaining flag bit data corresponding to each Tile region in the plurality of Tile regions from a syntactic element of the current video frame, the flag bit data being used for identifying the resolution corresponding to the Tile region.

3. The method according to claim 1, wherein the thresholds corresponding to the plurality of Tile regions are different from each other.

4. A video encoding method performed by an electronic device, the method comprising:
    performing division processing on a current video frame to obtain a plurality of tile-divided Tile regions comprised in the current video frame;
    determining a resolution corresponding to each Tile region in the plurality of Tile regions to obtain a plurality of resolutions, comprising at least two different resolutions, wherein:
        a resolution corresponding to each respective Tile region is determined according to a transmission bandwidth of a video stream including the current video frame from a source to the electronic device,
        a first resolution is chosen for the respective Tile region when the transmission bandwidth is less than a threshold corresponding to the respective Tile region,
        a second resolution is chosen for the respective Tile region when the transmission bandwidth is greater than the threshold, and
        the second resolution is higher than the first resolution; and
    encoding each Tile region based on the resolution corresponding to the Tile region among the plurality of resolutions, to obtain encoded data of the current video frame.

5. The method according to claim 4, wherein the determining a resolution corresponding to each Tile region in the plurality of Tile regions comprises:
    performing the following processing on the Tile region in the plurality of Tile regions:
        determining, for each resolution in a resolution set, a rate distortion cost of encoding the Tile region; and
        determining a resolution corresponding to a smallest rate distortion cost as the resolution corresponding to the Tile region.

6. The method according to claim 4, wherein the determining a resolution corresponding to each Tile region in the plurality of Tile regions comprises:
    obtaining an inputted resolution determining instruction, the resolution determining instruction being used for indicating the resolution corresponding to the Tile region; and
    determining the resolution indicated by the resolution determining instruction as the resolution corresponding to the Tile region.

7. The method according to claim 4, wherein the encoding the Tile region based on the resolution corresponding to the Tile region among the plurality of resolutions comprises:
    encoding the Tile region based on the resolution corresponding to the Tile region among the plurality of resolutions, to obtain encoded data corresponding to the Tile region;
    determining flag bit data corresponding to the encoded data corresponding to the Tile region, the flag bit data being used for identifying the resolution corresponding to the Tile region; and
    adding the flag bit data as a syntactic element to the encoded data corresponding to the Tile region.

8. The method according to claim 4, wherein the thresholds corresponding to the plurality of Tile regions are different from each other.

9. An electronic device, comprising a memory and a processor, the memory storing computer-readable instructions, and the computer-readable instructions, when executed by the processor, causing electronic device to perform a plurality of operations including:

obtaining a current video frame, the current video frame being divided into a plurality of tile-divided Tile regions;

determining a resolution corresponding to each Tile region in the plurality of Tile regions to obtain a plurality of resolutions, comprising at least two different resolutions, wherein:

a resolution corresponding to each respective Tile region is determined according to a transmission bandwidth of a video stream including the current video frame from a source to the electronic device, a first resolution is chosen for the respective Tile region when the transmission bandwidth is less than a threshold corresponding to the respective Tile region, a second resolution is chosen for the respective Tile region when the transmission bandwidth is greater than the threshold, and the second resolution is higher than the first resolution; and decoding each Tile region based on the resolution corresponding to the Tile region among the plurality of resolutions, to obtain a decoded video frame.

10. The electronic device according to claim 9, wherein the determining a resolution corresponding to each Tile region in the plurality of Tile regions comprises:

obtaining flag bit data corresponding to each Tile region in the plurality of Tile regions from a syntactic element of the current video frame, the flag bit data being used for identifying the resolution corresponding to the Tile region.

11. The electronic device according to claim 9, wherein the plurality of operations further comprise:

performing division processing on a second current video frame to obtain a plurality of tile-divided Tile regions comprised in the second current video frame;

determining a resolution corresponding to each Tile region in the plurality of Tile regions to obtain a plurality of resolutions, the plurality of resolutions comprising at least two different resolutions; and encoding the Tile region based on the resolution corresponding to the Tile region among the plurality of resolutions, to obtain encoded data of the second current video frame.

12. The electronic device according to claim 11, wherein the determining a resolution corresponding to each Tile region in the plurality of Tile regions comprises:

performing the following processing on the Tile region in the plurality of Tile regions:

determining, for each resolution in a resolution set, a rate distortion cost of encoding the Tile region; and determining a resolution corresponding to a smallest rate distortion cost as the resolution corresponding to the Tile region.

13. The electronic device according to claim 11, wherein the determining a resolution corresponding to each Tile region in the plurality of Tile regions comprises:

obtaining an inputted resolution determining instruction, the resolution determining instruction being used for indicating the resolution corresponding to the Tile region; and determining the resolution indicated by the resolution determining instruction as the resolution corresponding to the Tile region.

14. The electronic device according to claim 11, wherein the encoding the Tile region based on the resolution corresponding to the Tile region among the plurality of resolutions comprises:

encoding the Tile region based on the resolution corresponding to the Tile region among the plurality of resolutions, to obtain encoded data corresponding to the Tile region;

determining flag bit data corresponding to the encoded data corresponding to the Tile region, the flag bit data being used for identifying the resolution corresponding to the Tile region; and adding the flag bit data as a syntactic element to the encoded data corresponding to the Tile region.

15. The electronic device according to claim 9, wherein the thresholds corresponding to the plurality of Tile regions are different from each other.

* * * * *